United States Patent
Courtade et al.

(10) Patent No.: US 7,414,578 B1
(45) Date of Patent: Aug. 19, 2008

(54) METHOD FOR EFFICIENTLY COMPUTING THE BEAMFORMING WEIGHTS FOR A LARGE ANTENNA ARRAY

(75) Inventors: Thomas A. Courtade, Coopersville, MI (US); Dana J. Jensen, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/528,058

(22) Filed: Sep. 27, 2006

(51) Int. Cl.
*H01Q 3/00* (2006.01)
*G01S 5/02* (2006.01)

(52) U.S. Cl. .................. 342/377; 342/372; 342/378; 342/423

(58) Field of Classification Search .................. 342/372, 342/377, 378, 423
See application file for complete search history.

(56) References Cited

U.S. PATENT DOCUMENTS

| | | | |
|---|---|---|---|
| 6,016,123 A | 1/2000 | Barton et al. | |
| 6,075,484 A * | 6/2000 | Daniel et al. | 342/377 |
| 6,184,830 B1 * | 2/2001 | Owens | 342/377 |
| 6,529,166 B2 | 3/2003 | Kanamaluru | |
| 6,687,188 B2 | 2/2004 | Yang | |
| 6,795,424 B1 | 9/2004 | Kapoor et al. | |
| 6,850,190 B2 | 2/2005 | Ryu et al. | |
| 2004/0160364 A1 * | 8/2004 | Regev | 342/432 |
| 2004/0189524 A1 * | 9/2004 | Saucier et al. | 342/420 |
| 2006/0222101 A1 * | 10/2006 | Cetiner et al. | 375/267 |

OTHER PUBLICATIONS

N. Wang et al, A new high-resolution-and-capacity DOA estimation technique based on subarray beamforming, Conference Record of the Thirty-Eighth Asilomar Conference on Signals, Systems and Computers, vol. 2, lines 2345-2349, Nov. 2004.*
N. Wang et al, Pilot-aided DOA estimation for CDMA communication systems, IEEE International Symposium on Circuits and Systems, vol. 2, p. 1441-1444, May 2005.*
N. Wang et al, A new DOA estimation technique based on subarray beamforming, IEEE Transactions on Signal Processing, vol. 54(9), p. 3279-3290, Sep. 2006 (posted online Aug. 21, 2006).*
Carl B. Dietrich, Jr., "Antenna Arrays and Beamforming," found on website: http://scholar.lib.vt.edu/theses/available/etd-04262000-15330030/unrestricted/ch3.pdf, Sep. 19, 2006, pp. 29-52.

* cited by examiner

*Primary Examiner*—Thomas H. Tarcza
*Assistant Examiner*—Fred H. Mull
(74) *Attorney, Agent, or Firm*—Nathan O. Jensen; Kyle Eppele

(57) ABSTRACT

A method of determining the size of a sub-array for an antenna array is described. The method includes choosing a number of elements of a sub-array of antenna elements. Further, the method includes determining a direction of arrival of the signal using data from the sub-array. The method also includes computing weights for the antenna array. Further still, the method includes determining whether the size of the sub-array meets a predetermined criteria.

18 Claims, 5 Drawing Sheets

METHOD FOR EFFICIENTLY COMPUTING THE BEAMFORMING WEIGHTS FOR A LARGE ANTENNA ARRAY

BACKGROUND

In wireless communications, it is often desirable to be able to take advantage of directional communications in order to provide a higher quality of service than that available by using onmi-directional communications at the same power levels. This directionality provides greater gain in the desired direction causing fewer bit errors and the improved capability of acquiring a signal. For transmitting, all of the transmit power of a particular device may be focused toward the intended receiver. With respect to receiving signals, higher gain is directed on the source and very little gain is placed elsewhere. Beamforming using an adaptive antenna array is a method of realizing such a directional communication system.

An adaptive antenna array can provide higher gain in the direction required by digitally shifting the phases of the received signals from each antenna element (alternatively, the phase may be shifted using analog phase shifters as well). The logical solution to obtaining more gain and a narrower beam width is to increase the size and number of elements in the array. This poses a problem however, because the computational load to find sync on a signal with a large array increases exponentially as you increase the side length of the array. For example, a 4×4 element array may use 16 correlators to produce a correlation result for the received signal at each element of the array. These correlations could then be noncoherently summed and the peak of this correlation sum could then be used to find the sync position for the received signal. If a 100×100 element array were used, this would require 10,000 correlators running full time in order to find sync. At this size, the computational load may make using the array unpractical.

Accordingly, there is a need for a method for effectively using the gain and directionality of a large array by using the computations required by a small array. Further, there is a need for computationally simplifying the beamforming process for a large antenna array.

The techniques herein below extend to those embodiments which fall within the scope of the appended claims, regardless of whether they accomplish one or more of the above-mentioned needs.

SUMMARY

What is provided is a method of beamforming for an antenna array. The method includes choosing a sub-array of antenna elements from an array of antenna elements. The method also includes correlating an incoming signal with a training sequence at each element of the sub-array to produce correlation data of the received signal at each sub-array element. Further, the method includes estimating a direction of arrival of the signal using the correlation data and computing weights for the antenna array.

What is also provided is a communication platform. The communication platform includes an antenna array comprising a plurality of antenna elements. The communication platform also includes a sub-array comprising a subset of the plurality of antenna elements of the antenna array. Further, the communication platform includes a correlation algorithm to correlate an incoming signal with a training sequence to produce correlation data for the sub-array; a direction of arrival estimation algorithm to compute an estimate of the direction of arrival based on the correlation data; and a weight computation algorithm to compute weights for the antenna array.

Further, what is provided is a method of determining the size of a sub-array of an antenna array. The method includes choosing a number of elements of the sub-array. The method also includes determining a direction of arrival estimate using data from the sub-array. Further, the method includes computing weights for the antenna array. Further still, the method includes determining whether the size of the sub-array meets a predetermined criteria.

Alternative exemplary embodiments relate to other features and combinations of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which.

DETAILED DESCRIPTION

Figure 1:
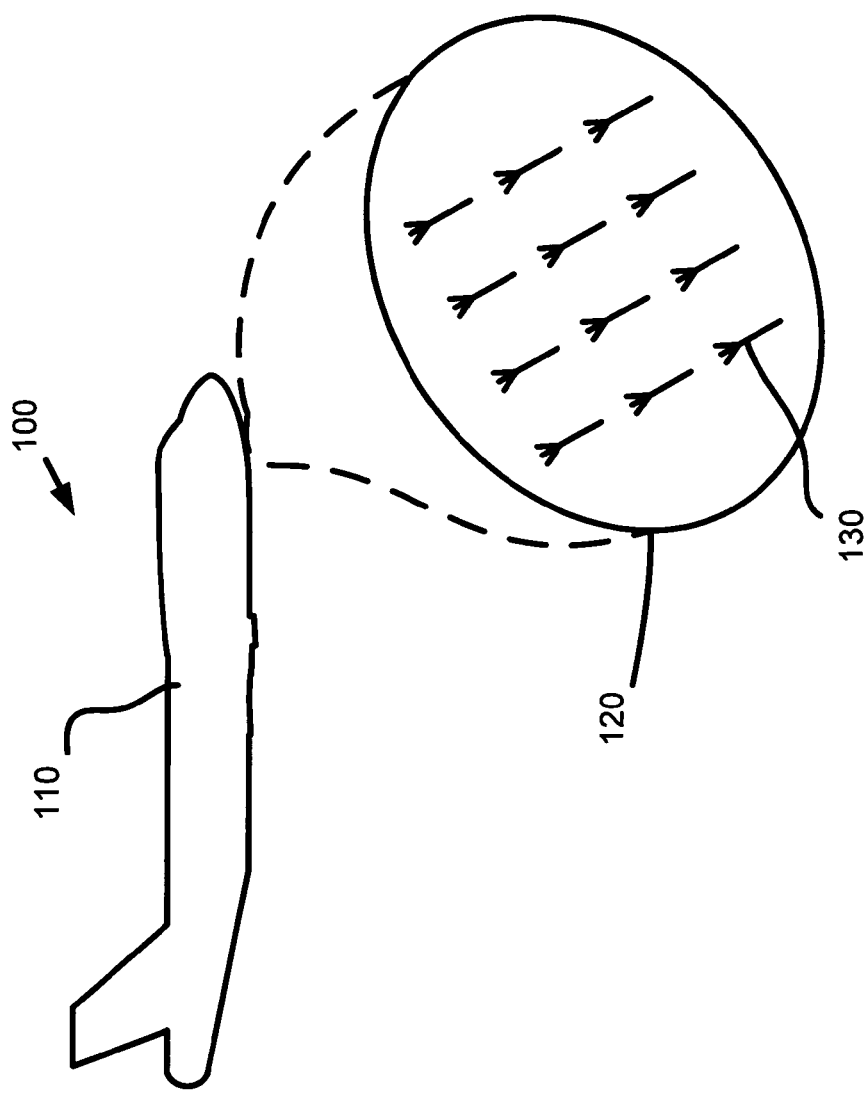
FIG. 1 is an exemplary diagram of an airborne communication system using a large antenna array.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring now to FIG. 1, an aircraft communication system 100 is embodied on an aircraft 110 having a communications antenna array 120. Antenna array 120 includes a plurality of antenna elements 130. Antenna array 120 may be mounted in any of a variety of areas of the aircraft without departing from the scope of the invention. Further, although antenna array 120 is depicted as mounted on airplane 110, antenna array 120 may be located in any of a variety of locations, including but not limited to ground-based, air-based, and/or space-based applications. Antenna array 120 may however be used for communications between the aircraft and any of a variety of other locations for voice, video, audio, and/or other data communications. Further, antenna array 120 may be used for a variety of other applications such as but not limited to use as a repeater in a larger network.

Conventionally, array beam forming techniques exist that can yield multiple, simultaneously available beams. These beamforming techniques may be used with antenna array 120 and the like. The beams can be made to have high gain and low sidelobes, or controlled beamwidth. Adaptive beam forming techniques dynamically adjust the array pattern to optimize some characteristic of the received signal. In beam scanning, a single main beam of an array may be steered and the direction can be varied either continuously or in small discrete steps.

Antenna arrays using adaptive beamforming techniques can reject interfering signals having a direction of arrival different from that of a desired signal. Multipolarized arrays can also reject interfering signals having different polarization states from the desired signal, even if the signals have the same direction of arrival. These capabilities can be exploited to improve the capacity of wireless communication systems.

An array consists of two or more antenna elements that are spatially arranged and electrically interconnected to produce a directional radiation pattern. The interconnection between elements, called the feed network, can provide fixed phase to each element or can form a phased array. In optimum and adaptive beamforming, the phases (and usually the amplitudes) of the feed network are adjusted to optimize the received signal.

In optimal beamforming techniques, complex weights for each element of the array can be calculated to optimize some property of the received signal. This does not always result in an array pattern having a beam maximum in the direction of the desired signal but may yield the optimal array output signal. Most often this is accomplished by forming nulls in the directions of interfering signals. Adaptive beamforming is an iterative approximation of optimum beamforming.

Figure 2:
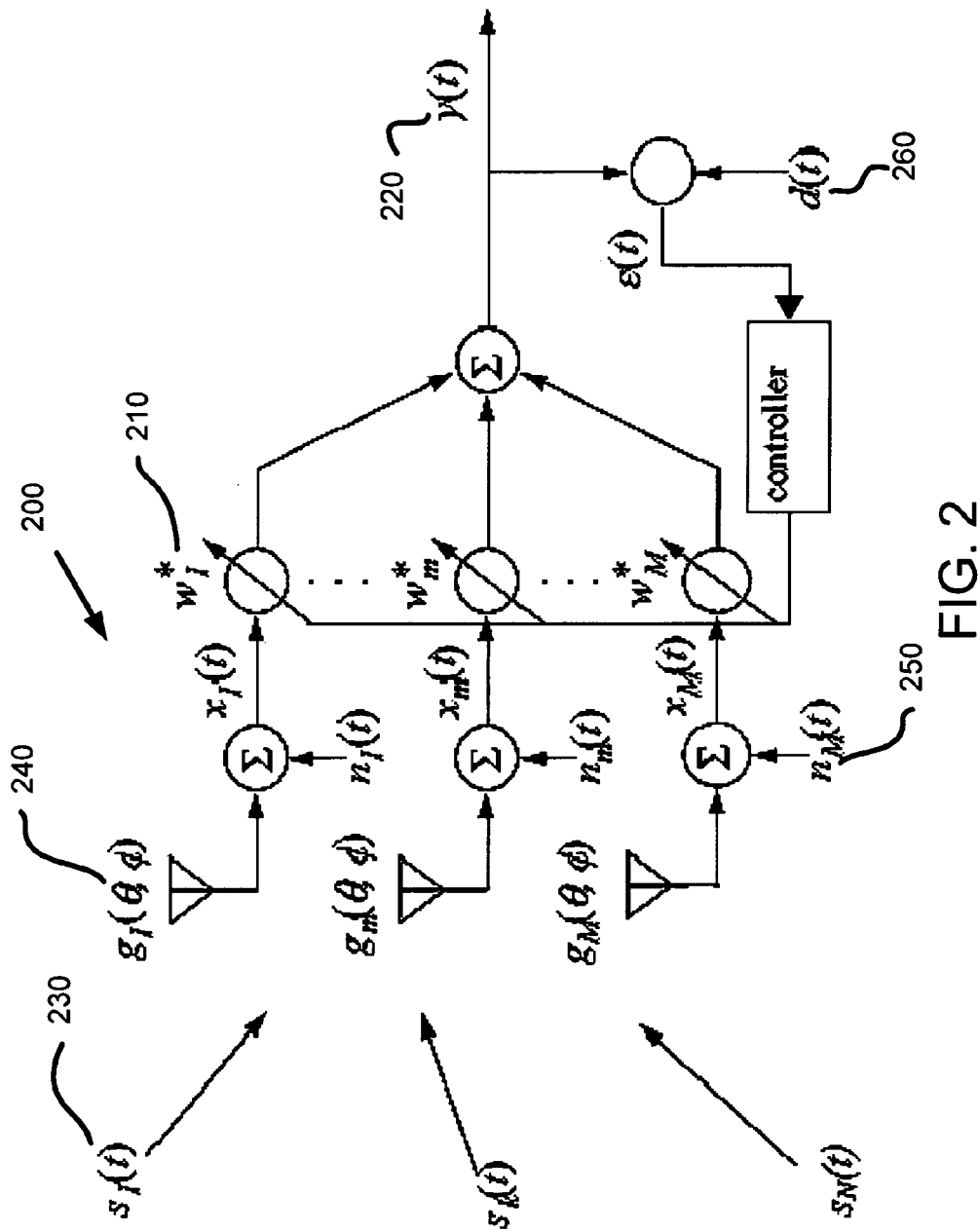
FIG. 2 is an exemplary diagram of an adaptive antenna array.

A general array 200 with variable element weights 210 is depicted in FIG. 2. The output of the array y(t) 220 is the weighted sum of the received signals $s_i(t)$ 230 at the array elements having patterns $g_m(\theta,\phi)$ 240 (the patterns include gain) and the thermal noise n(t) 250 from receivers connected to each element. In the exemplary embodiment depicted in FIG. 2, $s_j(t)$ is the desired signal, and the remaining L signals are considered to be interferers. In an adaptive system, the weights $w_m$ 210 are iteratively determined based on the array output y(t) 220, a reference signal d(t) 260 which approximates the desired signal, and previous weights. The reference signal is assumed to be identical to the desired signal. In practice this can be achieved or approximated using a training or synchronization sequence or a code division multiple access (CDMA) spreading code, which is known at the receiver.

Adaptive beamforming algorithms iteratively approximate a set of optimum weights. Many beamforming algorithms have been developed and are well known in the art. Such algorithms may include but are not limited to least mean squares (LMS), direct sample covariance matrix inversion (DMI), recursive least squares (RLS), decision directed, constant modules among other algorithms.

It has been demonstrated, that a 16-element 4×4 array may be capable of obtaining direction of arrival (DOA) estimates of less than 1° for a received signal at signal to interference-plus-noise ratios (SINR) that produce bit errors of 30-40%. Although the quality of service at these SINR levels is unacceptable, the DOA esimates are extremely accurate and have very small variances. This trend may be applicable to an array of any size.

Figure 3:
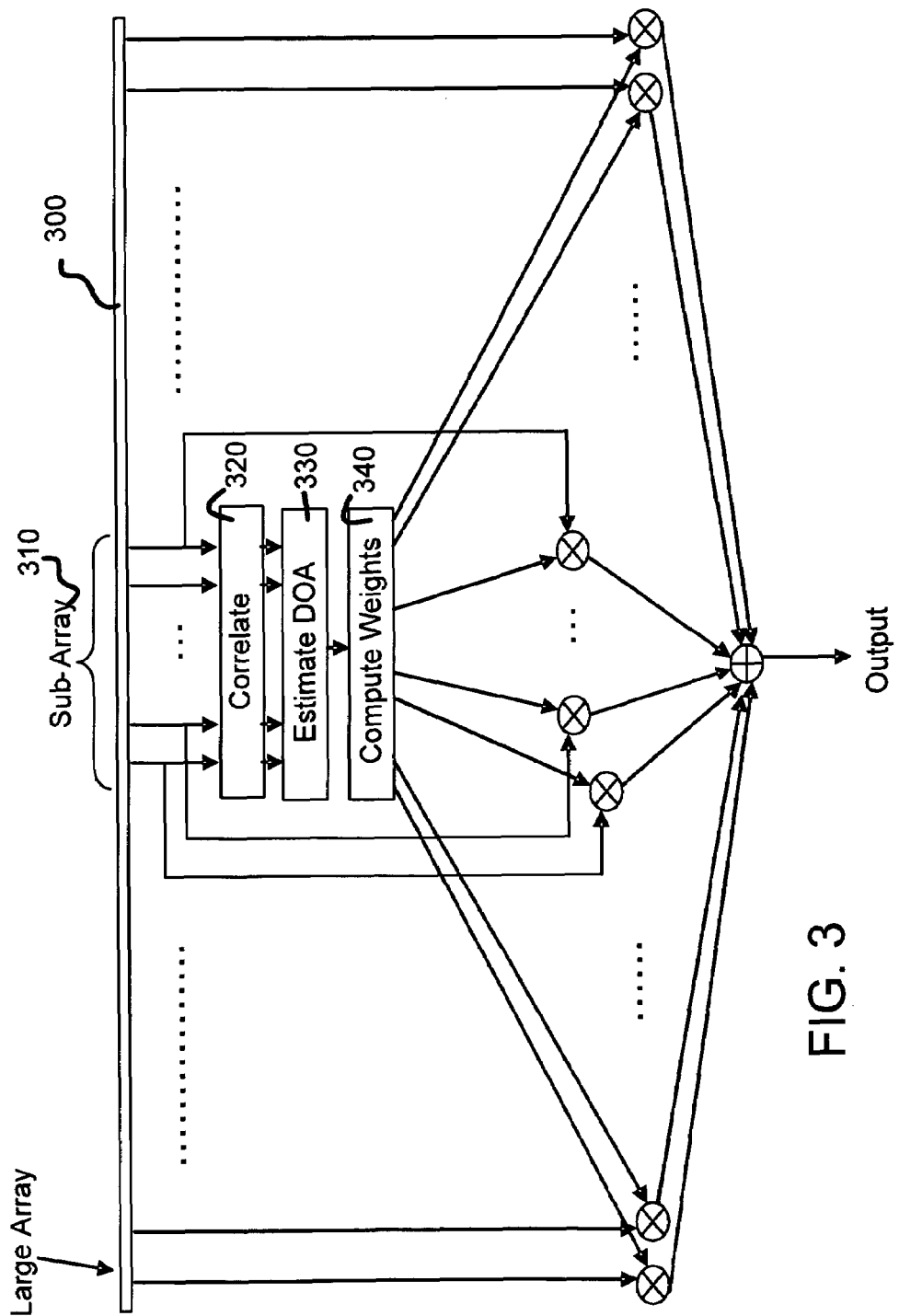
FIG. 3 is an exemplary diagram of an adaptive antenna array with a defined sub-array.

In an adaptive array, a set of complex weights (amplitude and phase-one for each element) is computed and applied to the signals from each element in order to coherently sum the results and produce a resultant signal, which is the output from the adaptive array system. As discussed above, these weights can be easily computed using a variety of different methods. One method of computing the weights is based on the direction of arrival of the signal. If a priori knowledge is known about the direction of the signal, the elements of the array can easily be phased up in order to steer the gain in the direction of the received signal. Referring now to FIG. 3, a large antenna array 300 is depicted. Since most of the time, no prior knowledge of the direction of the signal coming to array 300 is known (as in an ad-hoc networking system), the DOA may be estimated by correlating the signal with a training sequence at each element to produce a correlation peak at the sync position of the received signal at each element of a sub-array 310, by using a correlation algorithm 320. The phases of these correlation peaks may then be compared in order to derive the horizontal and vertical components (azimuth and elevation) of the DOA of the signal by a DOA estimation algorithm 330.

Now, because the direction of arrival can still be accurately calculated by using a relatively small sub-array 310 array even though the bit error rate (BER) is very poor, the estimated DOA information may be used to create a set of weights for the elements of a larger array by a weight computation algorithm 340. This would point a greater amount of gain (and a narrower beam) toward the received signal resulting in a higher SINR and a much lower BER, thus producing a usable channel for communications. Accordingly, a solution to the computational complexity of using a large array may be to avoid it altogether by using a small array to obtain the information necessary to compute the weights for the large array. Two separate arrays wouldn't necessarily be required. The small 310 array could be a sub-array consisting of the center elements (or other subset of elements) of the larger array 300.

This idea could be expanded upon by creating an algorithm that would choose an appropriately sized sub-array to obtain the direction of arrival information. One could start by using a 2×2 element array. If the SINR is too low and a good direction of arrival is unobtainable, then a 3×3 sub-array could be used, etc. This may ensure that the least amount of computations possible are performed and the benefits from the large array are gained.

This idea of using DOA in order to compute weights may be effective in a line of sight environment without heavy multipath. Because of these conditions, this technology may be extremely valuable for air-to-ground networking. A large array may be placed on a satellite or on the underside of an airplane. When a user on the ground transmits, the sub-array would determine the direction of arrival within a degree or so (and track the user) and the large array would be used to form a beam, with a width of 3-5°, in the direction established by the sub-array. This would establish a communications channel that would provide a high quality of service. Interference would be nulled because it would not be in the small beam created by the large array, and a great amount of gain would be placed on the signal.

Figure 4:
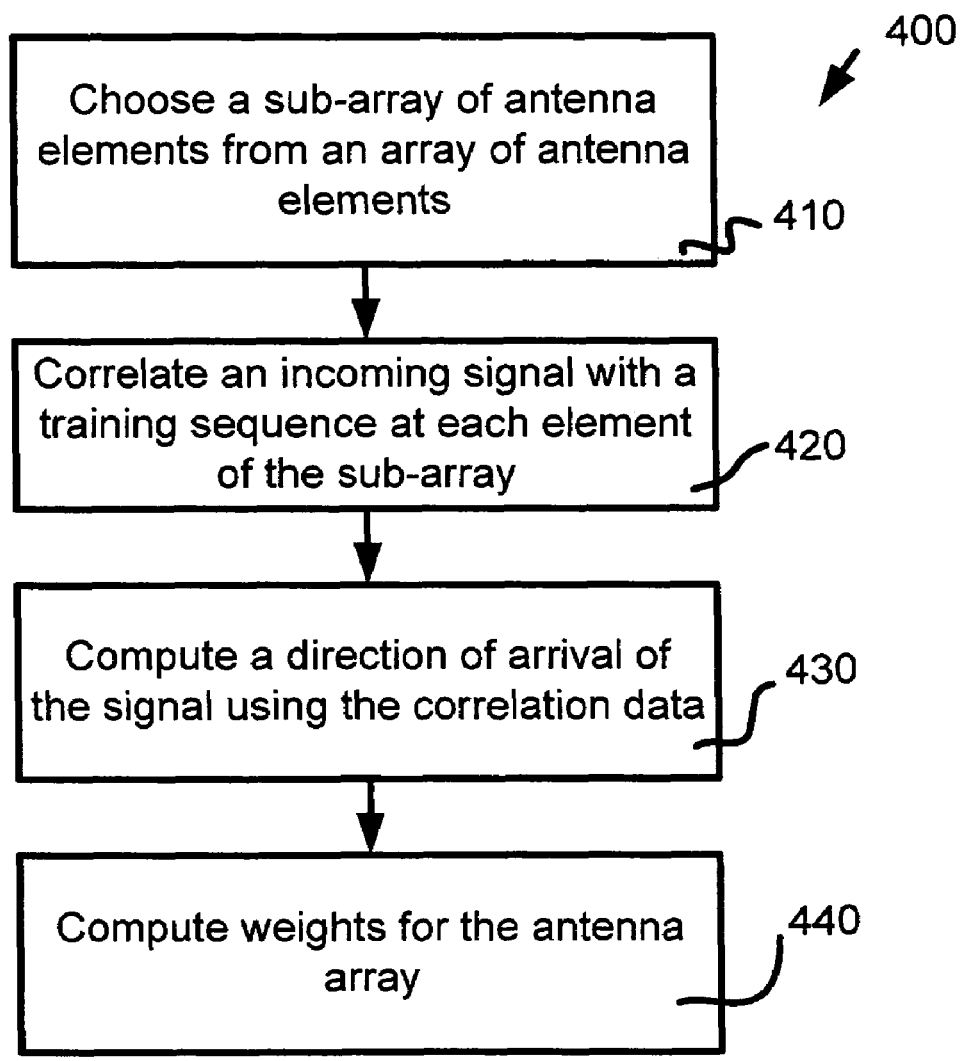
FIG. 4 is an exemplary process diagram of an adaptive weight finding algorithm.

Referring now to FIG. 4, a method of beamforming for an antenna array 400 is depicted. The method 400 includes choosing a sub-array of antenna elements from an array of antenna elements (process 410). Such a sub-array may be any of a variety of sizes such that it decreases the effective computational burden as compared to utilizing the entire array. Method 400 also includes correlating an incoming signal with a training sequence at each element of the sub-array to produce correlation data of the received signal at each sub-array element (process 420). The correlation is carried out by a correlation algorithm. A direction of arrival of the signal using the correlation data is then computed (process 430) and weights for the antenna array are computed (process 440).

Figure 5:
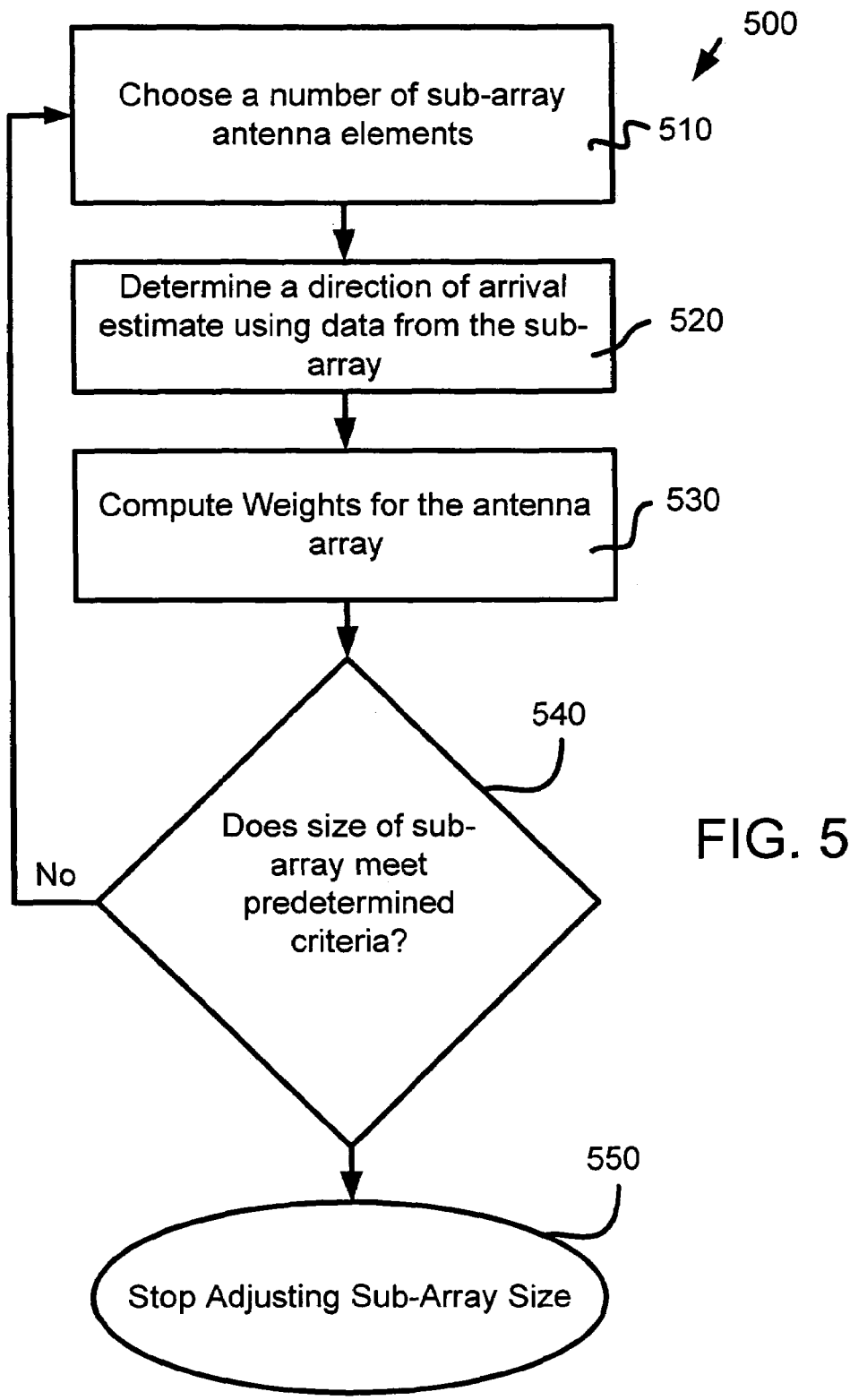
FIG. 5 is an exemplary process diagram of a sub-array sizing algorithm.

Referring now to FIG. 5, a method 500 of determining the size of a sub-array of an antenna array is depicted. Method 500 includes choosing a number of elements of the sub-array (process 510). This initial number of elements may be a predetermined initial starting point or may be chosen randomly within pre-specified constraints. A direction of arrival estimate using data from the sub-array is determined (process 520). The estimate is determined based on correlation data of a received signal. Weights for the antenna array are then computed (process 530). These weights may include gain and phase information and may be complex weights. Method 500 also includes determining whether the size of the sub-array meets a predetermined criteria (process 540). Such a predetermined criteria may include an error level or energy level or the like. Once the predetermined criteria is met, the process of adjusting the sub-array size is stopped (process 550).

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

What is claimed is:

1. A method of beamforming for an antenna array, comprising:
   choosing a number of sub-array antenna elements from an array of antenna elements using an iterative algorithm;
   correlating an incoming signal with a training sequence at each element of the sub-array to produce correlation data of the received signal at each sub-array element;
   estimating a direction of arrival of the signal using the correlation data; and
   computing weights for the antenna array.

2. The method of claim 1, wherein the correlation data comprises correlation peak data at the sync position.

3. The method of claim 1, wherein the weights of the antenna array comprise adaptive weights.

4. The method of claim 3, wherein the adaptive weights comprise gains.

5. The method of claim 1, wherein the antenna array is a part of an airborne platform.

6. The method of claim 1, wherein the algorithm comprises computing weights for the antenna array.

7. A communication platform, comprising:
   an antenna array comprising a plurality of antenna elements;
   a sub-array comprising a subset of the plurality of antenna elements of the antenna array, a number of elements of the sub-array are chosen by an iterative algorithm;
   a correlation algorithm to correlate an incoming signal with a training sequence to produce correlation data for the sub-array;
   a direction of arrival estimation algorithm to compute an estimate of the direction of arrival based on the correlation data; and
   a weight computation algorithm to compute weights for the antenna array.

8. The platform of claim 7, wherein the correlation data comprises correlation peak data at the sync position.

9. The platform of claim 7, wherein the weights of the antenna array comprise adaptive weights.

10. The platform of claim 9, wherein the adaptive weights comprise gains.

11. The platform of claim 7, wherein the antenna array is a part of an airborne platform.

12. The platform of claim 7, wherein the weight computation algorithm includes an iterative algorithm.

13. A method of determining the size of a sub-array of an antenna array, comprising:
   choosing a number of elements of the sub-array;
   determining a direction of arrival estimate using data from the sub-array;
   computing weights for the antenna array; and
   determining whether the size of the sub-array meets a predetermined criteria.

14. The method of claim 13, further comprising:
   repeating the process steps if the predetermined criteria is not met.

15. The method of claim 13, wherein the predetermined criteria is an error function.

16. The method of claim 13, wherein the method is an iterative method in which the number of elements of the sub-array are increased with each iteration.

17. The method of claim 13, wherein the weights comprise gains.

18. The method of claim 13, wherein the weights comprise complex weights.

* * * * *